United States Patent Office 3,080,655
Patented Mar. 12, 1963

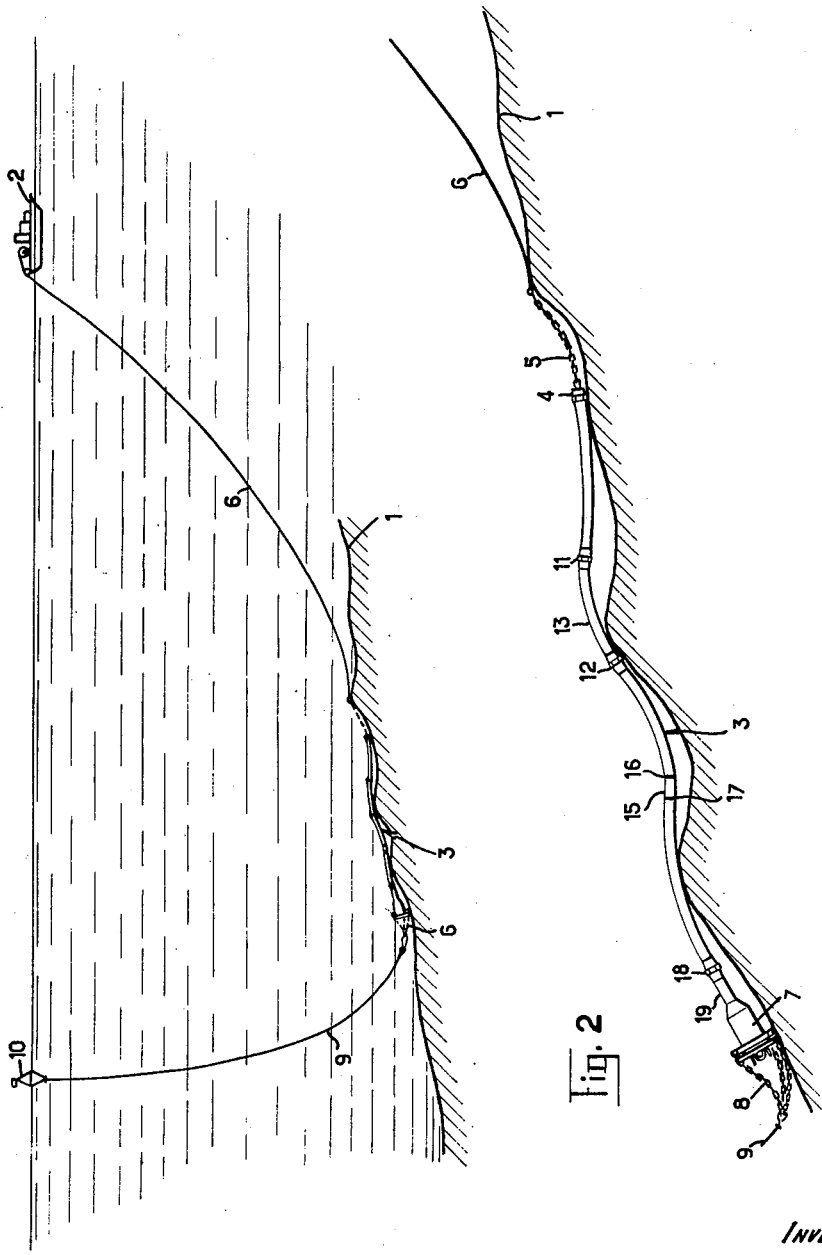

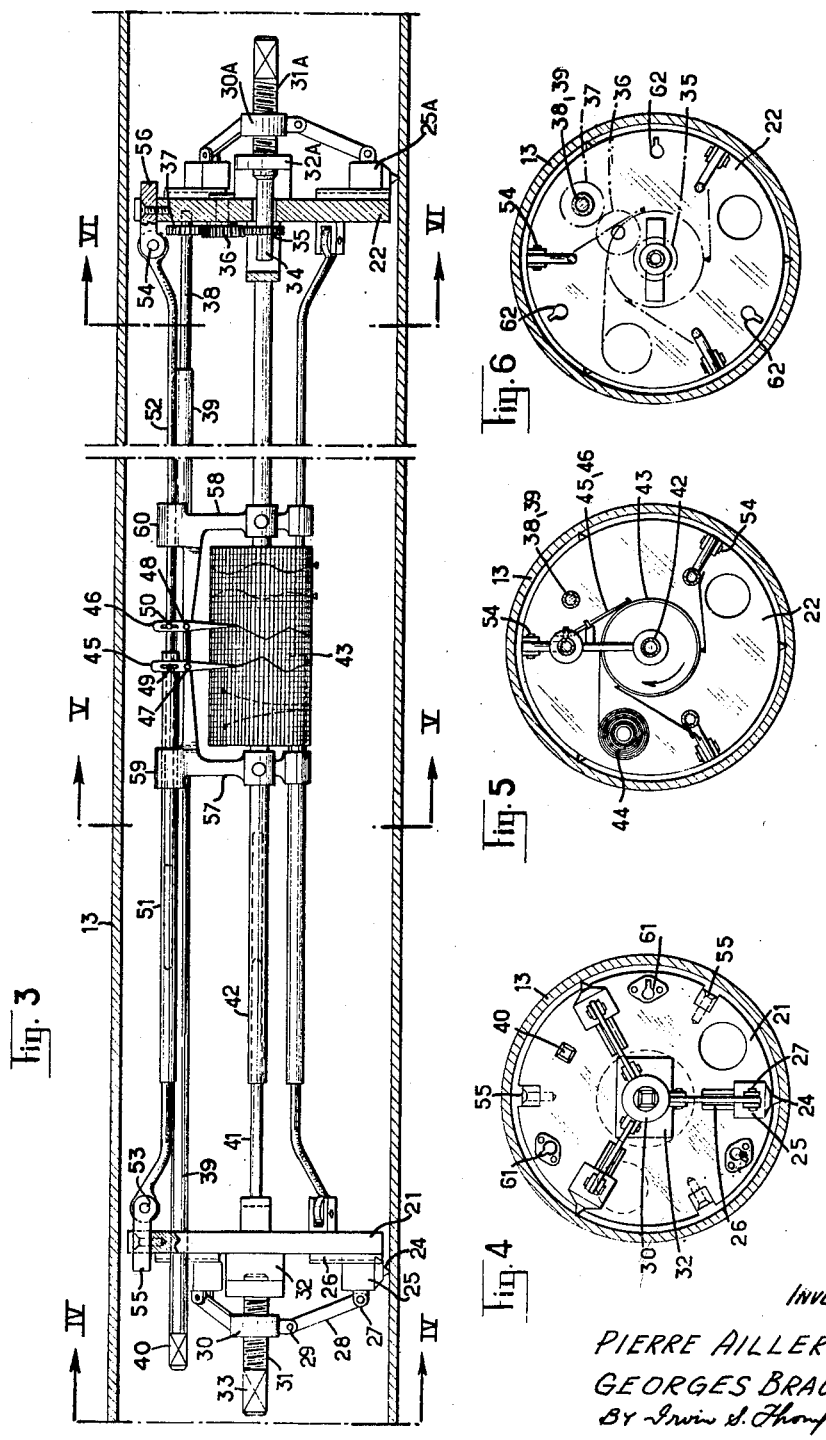

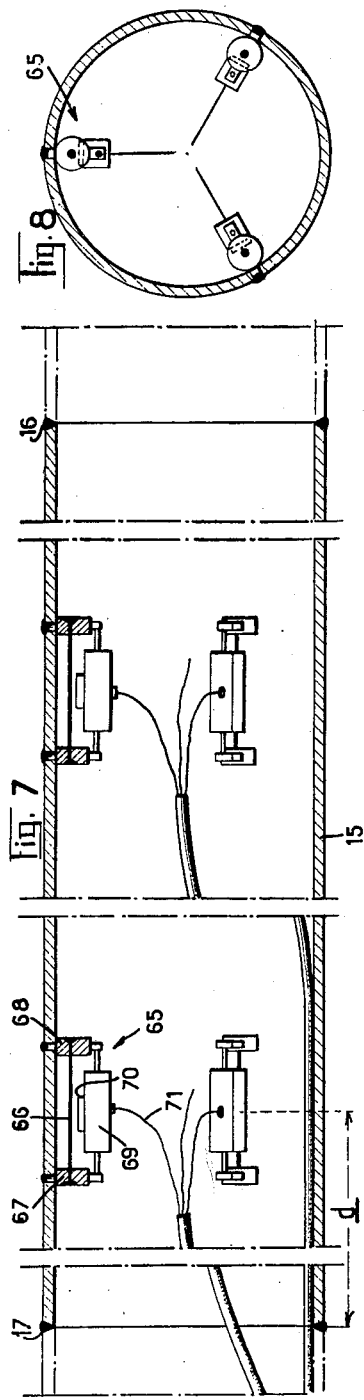

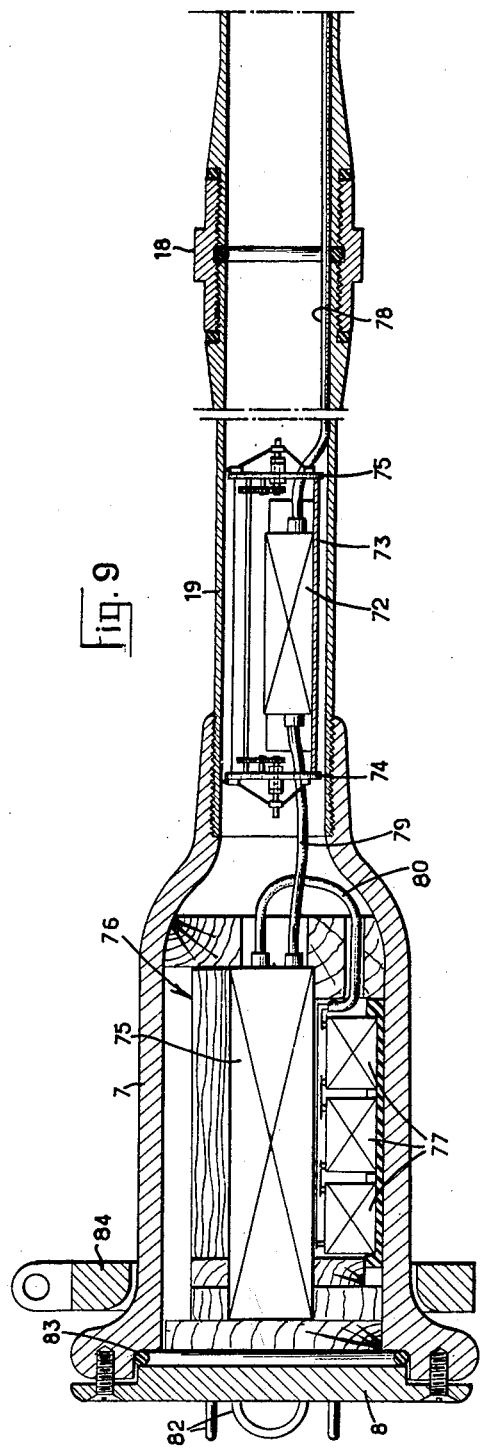

3,080,655
APPARATUS AND METHODS FOR EXPLORING THE TOPOGRAPHY OF THE SEA
Pierre Ailleret, Paris, and Georges Braudeau, Viroflay, France, assignors to Electricite de France (Service National), Paris, France, a French national service
Filed Dec. 16, 1960, Ser. No. 76,178
Claims priority, application France Dec. 22, 1959
5 Claims. (Cl. 33—1)

The present invention relates to a method of and an apparatus for exploring the topography of the sea bed for the purpose of laying a submarine cable.

It is known that the laying of a submarine cable calls for exploration of the topography of the sea bed along the course contemplated, in such manner as to ensure that the cable will not be subjected to undue strain in consequence of unevenness in its bearing on the ground.

There is usually employed for this purpose supersonic sounding apparatus, but when the depth is very considerable, for example greater than one thousand metres, the separating power of the supersonic sounding apparatus is no longer sufficient to reveal with the necessary precision all features of the ground liable to provide a danger to the cable, particularly in the case of irregularities in the firmness of the ground.

The method according to the invention, adapted to overcome these drawbacks, consists essentially in forming a pipe-like test element of suitable length, in equipping a central section of this element with apparatus for indicating deformation of and/or strains on this section, and in hauling over the sea bed along the contemplated course the element thus equipped whilst recording the indications of the said apparatus.

As the test element thus occupies successively all of the positions in which an element of the same length of the cable to be laid will be located, if it has a weight per metre and a rigidity equal to those of the future cable and if it is sufficiently long for the effect of the ends to be negligible in the section being measured, the strains recorded during the exploration thus effected will be equal to the strains to which the cable will be subjected in its different sections once it has been laid.

The recording of the information supplied by the indicating apparatus will be effected either by recording means incorporated in the exploring element or on board the towing ship when a suitable transmission line for the said information may be provided.

The present invention accordingly comprehends apparatus for exploring the topography of the sea bed comprising a pipe-like test element, and a mechanical recording extensometer mounted in a portion of said test element, said extensometer being adapted to detect and record deformations of the said element portion along three lines disposed at equal angles about the axis of the element portion.

The present invention also comprehends apparatus for exploring the topography of the sea bed comprising a pipe-like test element, three vibrating wire extensometers disposed within the periphery of a portion of said element and equiangularly spaced about the axis of the element, and a magnetic recording device connected to said extensometer and operable to record signals from the extensometers indicative of the tension in each of the vibrating wires.

It is not essential to employ for exploration purposes a test element identical with the cable which it is being prepared to lay. There may be employed an equivalent test element, the criterion of equivalence being the value of the proportion $R=EI/P$, in which E is the modulus of elasticity of the material of the cable, I is the inertia moment of the section and P is the weight per metre of the cable in the water.

Neither is it essential that the effect of the ends of the element should be entirely negligible, which would lead to excessive lengths, because the method does not pretend to give an exact evaluation of the strains to which the cable would be subjected after being laid, but only to reveal the possibility or not of dangerous situations in respect of a given zone, the test element obviously not being capable of being towed along the exact course on which the cable will subsequently be laid.

The minimum length to be employed in practice for the purpose of a test will depend on the one hand on the quality of the information obtained by sounding, and in consequence on the depth of the water and the performance of the sounding apparatus, and on the other hand on the mechanical properties of the cable.

In given sounding conditions, the irregularities of the sea bed will in point of fact have all the more chance of passing undetected or of being badly recognized as the spacing between them is smaller. Now, if this spacing is less than a certain length dependent on characteristics of the cable which may be taken in first approximation equal to the load which it is able to support on simple supports without subjection to undue strain, being $$\left(8\frac{I}{r}\cdot\frac{n}{p}\right)^{1/2}$$

these irregularities are unable to place the cable in danger. In this formula:

I is the moment of inertia,
r is the external radius,
n is the maximum strain,
p is the weight of the cable per metre.

The interesting irregularities to be studied by the method are accordingly those, the spacing of which is between a lower limit of length, below which they are not dangerous, and an upper limit of length, above which the possibility that they are inaccurately known by sounding is sufficiently small.

For the apparatus to be fully satisfactory it is necessary that the length of the test element to be drawn over the bottom shall be slightly greater than the upper limit of length above referred to.

In practice it will be sufficient, generally speaking, if it is equal to two or three times the lower limit of length, because if the test does not reveal any dangerous irregularity in the entire zone explored there is little probability that one will exist, the length of which is just located between the length of the test element and the upper limit of length.

It will be noted that the dangerous limit of the spacing has been taken whilst ignoring the continuity of the cable.

The test element, if it has the length above referred to, will be more like the beam on simple supports the greater is the spacing between the irregularities. But the measured strains might correspond either to the middle of the range or to a bearing point, which ensures that no dangerous situation is able to escape.

In order that the invention may be more clearly understood a preferred embodiment thereof will now be described with reference to the accompanying drawings, in which:

FIG. 1 is a diagrammatical view showing the carrying of the method into effect.

FIG. 2 is a view to enlarged scale of the test element.

FIG. 3 is a diagrammatical view in partial section along a diametrical plane of a portion of the test element equipped with mechanical extensometers.

FIGS. 4, 5 and 6 are cross-sectional views along the planes IV—IV, V—V and VI—VI respectively in FIG. 3.

FIG. 7 is a diagrammatical view in diametrical section of a portion of the test element equipped with sound-indicating means.

FIG. 8 is a corresponding view in cross-section.

FIG. 9 is a diagrammatical view in longitudinal section of the rear end portion of the test element containing a recording apparatus in association with sound-indicating means.

In the drawings like references indicate the same or similar parts.

In the example of use considered here it is proposed for the purpose of traversing the Mediterranean between Mostagem and Carthagena, with 2,500 metres of bottom, to lay a cable of 20 cm. in diameter weighing approximately 20 kg. per metre. For this purpose there is drawn over the bottom 1 (FIGS. 1, 2) by means of a towing vessel 2 a test element or section 3 of approximately 130 metres in length. A plug 4 adapted to close the front end of the test element is connected by means of a chain 5 to the towing cable 6, whilst a bulb 7 provided at the rear end of the test element is connected by means of three chains 8 to the end of a cable 9 leading to a buoy or vessel 10 adapted to enable the said bulb to be lifted out of the water.

The fixing of 130 metres as the length of the test element results from the following considerations as applied to that which has been set forth in the above:

(1) A portion of this element located on simple supports spaced forty metres apart will be subjected to a strain of 10 kg./mm.$^2$, which it is estimated should not be exceeded having regard to other stresses to which the cable is subjected.

(2) With the chosen value of 130 metres, the length of the element will be slightly more than three times the length indicated in the above.

(3) This length is substantially equal to 5% of the depth, which causes the probability (having regard to the sounding apparatus employed) that irregularities having between them spacings greater than 130 metres will not be seen upon the supersonic sounding to appear small.

The test element comprises in a portion intermediate of its length, between two threaded sleeves 11, 12 a portion 13 having a length of approximately thirty metres equipped with mechanical extensometers of the kind which will be described in the following with reference to FIGS. 3 to 6. At a certain distance (for example of approximately thirty metres) towards the rear of the part 13 a portion 15 of the test element having a length of approximately five metres, limited by two circular solderings 16, 17, is equipped with sound indicating means which will be described with reference to FIGS. 7, 8. A sleeve 18 connects the rear end of the test element to a pipe element 19 disposed in an extension of the bulb 7 and serving together therewith to house the electronic section associated with the sound indicating means of the portion 15.

The portion 13 is equipped at approximately one metre from each of its ends 11, 12 with a mechanical recording extensometer adapted to detect and record extensions or contractions of the cable along three lines equiangularly spaced about the axis of that portion of the element.

According to the embodiment selected and illustrated by way of example in FIGS. 3 to 6, a recording extensometer of this nature is formed between two circular plates 21, 22 having a diameter slightly less than the internal diameter of the element. Each of these plates is adapted to be fixed in a cross-section of the element by means of three fixing points 24. On the plate 21, referred to, for example, as the front plate, each of these points is carried by a block 25 adapted to slide radially in a slideway 26, the three slideways 26 being disposed along three radii spaced 120° apart. Each of the point-carrying blocks 25 is connected by an articulation 27 to a rod 28, the other end of which is articulated at 29 to a threaded muff 30 co-operating with an axial screw 31 turning in a bearing 32 provided for this purpose at the centre of the plate and terminating in a square end 33.

The point-carrying blocks 25A of the rear plate are connected in identical fashion to a threaded muff 30A co-operating with an axial screw 31A. The latter, however, is extended beyond its bearing 32A by a pin 34 carrying in front of the rear plate a pinion 35 meshing through the medium of an intermediate pinion 36 with a control pinion 37 keyed to the end of a telescopic shaft 38—39 passing through the front plate 21 and terminating in front thereof in a square end 40. The two elements 38, 39 of the telescopic shaft are naturally rigid in rotation (for example by means of grooves).

A telescopic spindle 41, 42 provided between the centres of the two plates carries approximately half-way between them a recording cylinder 43 equipped in the known manner with a clockwork mechanism (not detailed) adapted to operate, for example, at a rate of one revolution per day, with a reserve of movement, for example, of eight days. The recording material is constituted in likewise known fashion by a paper tape or the like which is unwound from a reel 44 (FIG. 5) disposed for this purpose to the side of the cylinder 43.

This cylinder co-operates with three pairs of styli such as 45, 46 which are movable about axes 47, 48 fixed in relation to the support 42 for the recording cylinder and connected by means of fingers 49, 50 respectively to the elements 51, 52 of a telescopic shaft, the free ends of these elements being articulated at 53 and 54 respectively to control pieces 55, 56 distributed by 120° about the periphery of the two plates 21, 22. The pivots 47, 48 of the styli are carried on arms provided for this purpose on two supports 57, 58 secured on the spindle 42 on either side of the cylinder 43. These parts also form guide sleeves 59, 60 for the telescopic elements 51, 52.

The two plates 21, 22 finally each comprise three eyelets 61, 62 permitting of their provisional rigidity during transport and the positioning in the cable by means of three rods (not shown), each of these rods comprising two catches adapted to lock one in an eyelet 62 of the rear plate 22 and the other in an eyelet 61 in the front plate 21, the distance of these two catches being equal on each rod to that which it is desired to establish between the two plates, for example one metre.

The portion 13 of the test element being dismantled, an assembly thus constituted is introduced through each of these ends, being advanced by approximately one metre towards the inside. The two plates 21, 22 being provisionally made rigid by means of their catch rods the rear plate is thus disposed at approximately two metres from the corresponding end and the front plate one metre therefrom. A square key is then made to engage over the end 33 of the clamping screw 31 for the front plate, and this is turned until the three fixing points 24 engage in the inner wall of the test element. This operation is then repeated by placing the key over the square end 40 of the telescopic shaft 38—39, until the rear plate is fixed in turn in the corresponding portion of the element. The two plates thus being made rigid with two straight portions of the element, the three catch rods are withdrawn and the apparatus is ready for operation. Any deformation of the element liable to result from an appreciable flexing movement will result in corresponding elongations and contractions of the three telescopic arms recorded respectively by the three pairs of styli 49, 50, on the basis of 1 metre defined by the spacing between the two plates 21, 22 in each of the two assemblies. The recordings obtained, for example during one week, over a given distance constitute an immediately interpretable representation of the strains to which the element is subjected at different points of the said distance. The information thus collected constitutes the essential basis for a decision in the selection of a site for the actual projected laying of the cable.

This information may be usefully doubled and coupled with that adapted to be obtained by the other system of extensometer illustrated in FIGS. 7 to 9.

As will be seen from FIGS. 7 and 8, the portion 15 of the test element is equipped, for example at a distance $d$ of sixty centimetres from each of its ends 16, 17 with three acoustic indicators 65 distributed at 120° about the periphery of the element. Each of these indicators is constituted by a vibrating wire extensometer, for example of the Telemac type, comprising in the manner known per se a vibrant wire 66 of magnetic material stretched between two plates 67, 68 secured, for example, ten centimetres apart in the wall of the element, and a coil 69 provided about a core 70 forming with the vibrant wire a magnetic circuit. Each of these coils is connected by a cable 71 to a corresponding amplifier housed in a casing 72 in the interior of the pipe 19 (FIG. 9) and constitutes with this amplifier a generator of electrical oscillations maintained at a variable frequency according to the mechanical tension to which the vibrant wire is subjected.

The amplifier casing 72 is disposed in a supporting chassis 73 provided between two plates 74, 75, the fixing of which in the pipe element 19 is ensured by means of fixing screws in a manner similar to that described in the above in respect of the plates 21, 22 of the mechanical recording extensometers.

The currents of frequency delivered by each of the six vibrating-wire extensometers thus constituted and mounted in the test element are recorded in a magnetic recording device, conveniently a seven-track magnetophone 75 mounted in the bulb 7 by means of wooden frame 76 also adapted to house an accumulator 77. In FIG. 9 the reference numeral 78 indicates the bundle of six cables coming from the indicators 65 and a multiple-cable line 79 ensures connections of the block of amplifiers to the magnetophone, and the feeding through the medium thereof of the said amplifiers, whilst the cable 80 connects the battery 77 to the said magnetophone. The bulb is closed by a cover member 81 secured by screws and furnished with rings 82, tightness of the connection being ensured by a joint 83. Finally, a manipulating collar 84 is disposed about the bulb for the purpose of connecting thereto chains 8.

In a possible form of embodiment the characteristics of the magnetophone 75 have been taken as follows:

Dimensions of the casing: 800 x 385 x 200 mm.
Number of tracks recorded: 7, of which one track is based on time.
Diameter of the unused reel: 360 mm.
Width of the tape: 12.7 mm.
Thickness of the tape: 30μ.
Time of recording: 24 hours.
Rate of recording: 2.38 cm./sec.
Frequency band recorded: from 50 to 1,200 cycles.
Feeding: 18 volts continuous current.
Consumption: approximately 8 watts.
Instantaneous consumption: at starting and stopping: approximately 150 watts.

In an apparatus constructed in accordance with these specifications the seventh track was employed for the recording of time base signals supplied for this purpose by a clock incorporated in the apparatus and adapted to ensure its proper starting with a delay adapted to be adjusted to a predetermined value between 0 and 4 hours. The apparatus having been adapted to operate for a period of 24 hours, the bulb at the end of a useful working period, at the most equal to this value, is raised and lifted from the water by means of the cable 9 for the purpose of changing the recorded reel and the batteries 77 after opening the cover 81. In the apparatus thus recharged the mechanism for delayed starting is adjusted according to the time provided for the reclosing of the bulb, the descent anew of the test element to the bottom of the sea and the renewal of the exploration.

It will be understood that the invention is not limited to the example selected and illustrated, the details of construction indicated being capable on the contrary of giving rise to numerous modifications which will be readily apparent to the skilled man, both as regards selection of the extensometers, of which various types are available on the market, as well as the method of recording their indications. There is furthermore no objection to the extensometers of the kind indicated being replaced or supplemented by other means for measuring the strain (for example, piezo-electric devices).

We claim:

1. Apparatus for exploring the topography of the sea bed comprising a pipe-like test element, a mechanical recording extensometer mounted in a portion of said test element, said extensometer being adapted to detect and record deformations of the said element portion along three lines disposed at equal angles about the axis of the element portion, said mechanical recording extensometer including two circular plates fixed in spaced relation in said element portion and each having a diameter slightly less than the internal diameter of said element portion, three pairs of telescopic arms articulately mounted between said plates and equiangularly spaced about the axis of said element portion, a recording cylinder centrally mounted within said arms, means for rotating the cylinder means for feeding paper tape on to the cylinder as it rotates, and six styli respectively connected one to each telescopic arm and bearing in pairs on said cylinder to record as tracks on said tape the displacement of each arm.

2. Apparatus according to claim 1 including towing means adapted to haul the test element over the sea bed from one end.

3. Apparatus according to claim 1 including three vibrating wire extensometers disposed within the periphery of another portion of said element and being equiangularly spaced about the axis of the element, and a recording device connected to said vibrating wire extensometers and operable to record signals therefrom indicative of the tension in each of the vibrating wires.

4. Apparatus according to claim 3 including a bulb attached to one extremity of the test element and a wooden frame in the bulb for mounting the recording device.

5. A method of exploring the topography of the sea bottom for the purpose of laying a submarine cable, comprising the steps of setting up a pipe-like test element having physical characteristics similar to those of the cable which it is desired to lay, equipping the test element with at least one means for indicating deformations and strains to which a portion of the test element is subjected, and hauling the test element over the sea bed along the course contemplated for the cable and recording the indications furnished by the indicating means.

References Cited in the file of this patent
UNITED STATES PATENTS

| | | |
|---|---|---|
| 1,418,725 | May | June 6, 1922 |
| 2,485,977 | Mains | Oct. 25, 1949 |
| 2,834,113 | En Dean et al. | May 13, 1958 |
| 2,879,126 | James | Mar. 24, 1959 |
| 2,880,612 | Coyne et al. | Apr. 7, 1959 |
| 2,930,137 | Arps | Mar. 29, 1960 |